No. 707,988. Patented Aug. 26, 1902.
W. G. TRETHEWEY.
AUTOMATIC TRAIN PIPE COUPLING.
(Application filed Jan. 8, 1902.)
(No Model.) 4 Sheets—Sheet 4.
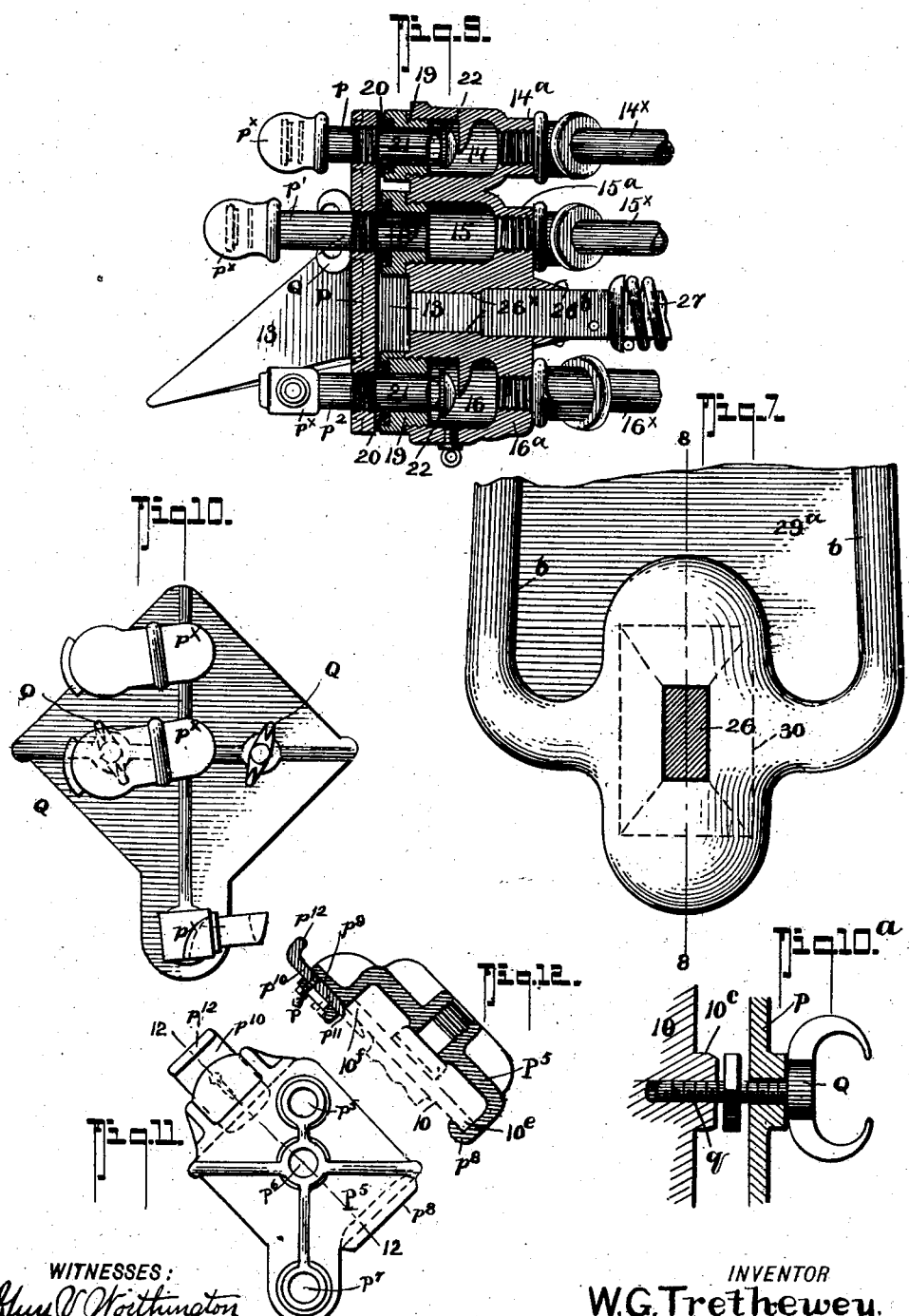
WITNESSES:
Guy V. Worthington
Louis Dieterich
INVENTOR
W. G. Trethewey,
BY
Fred G. Dieterich & Co.
ATTORNEYS.

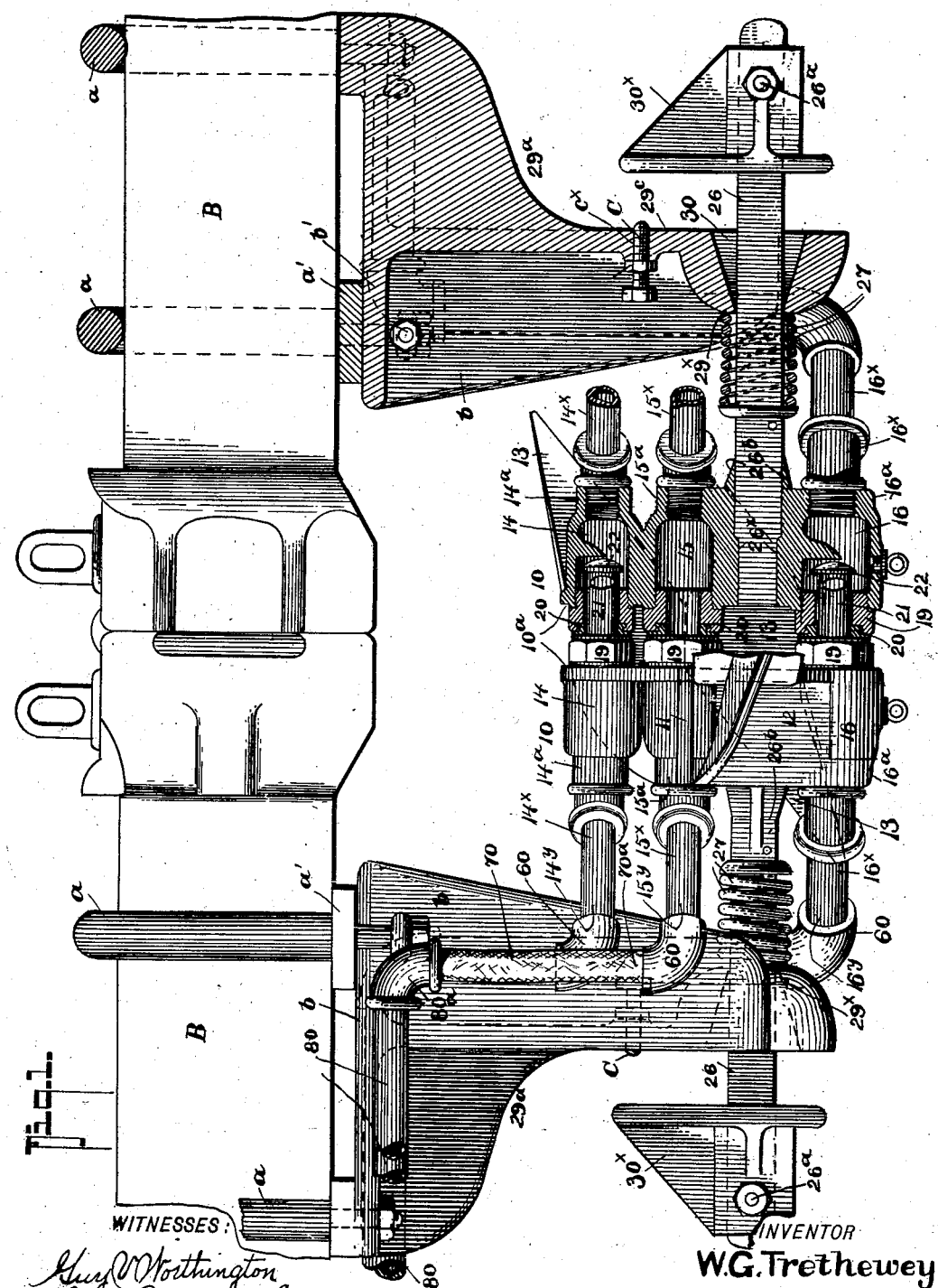

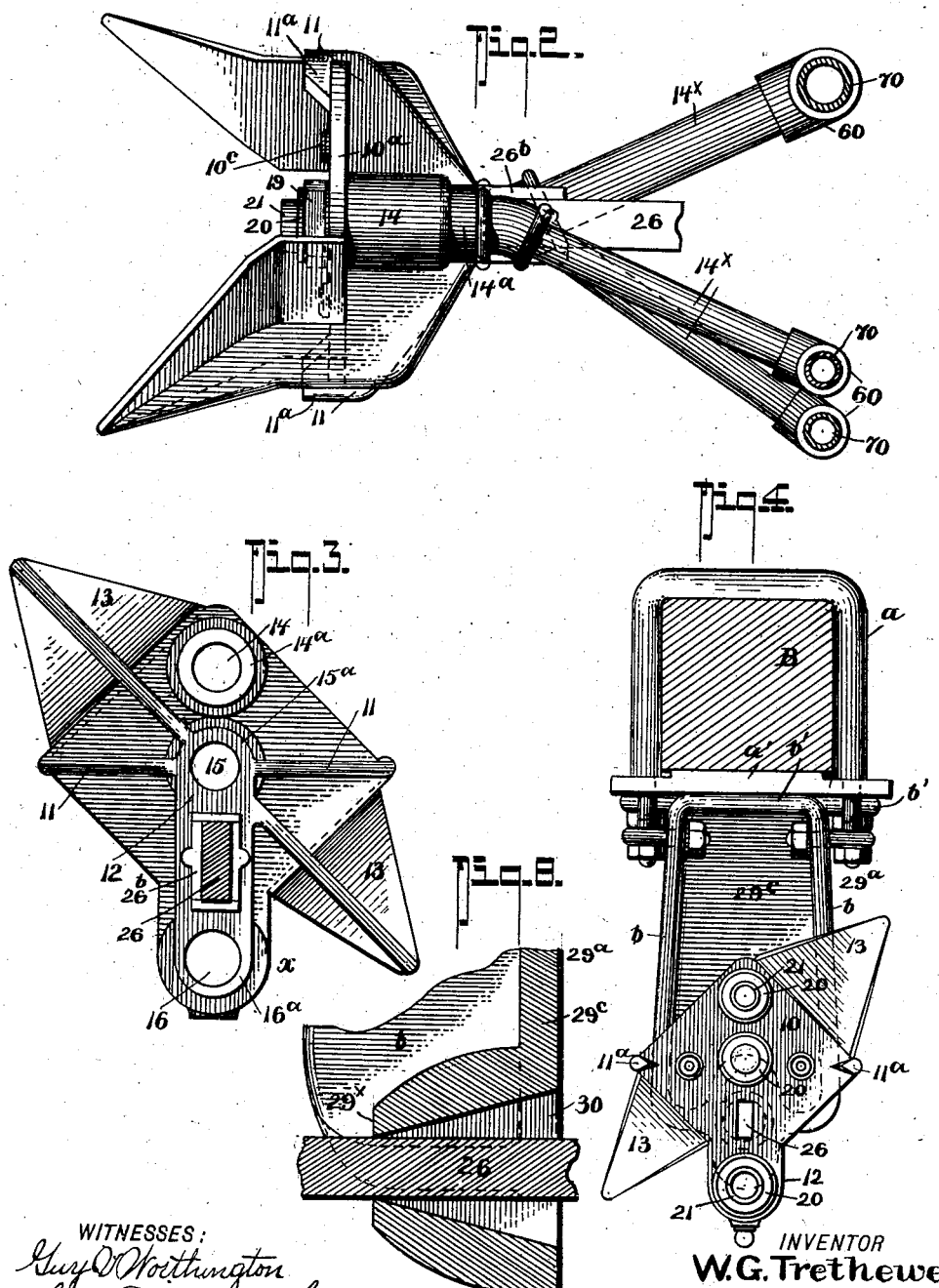

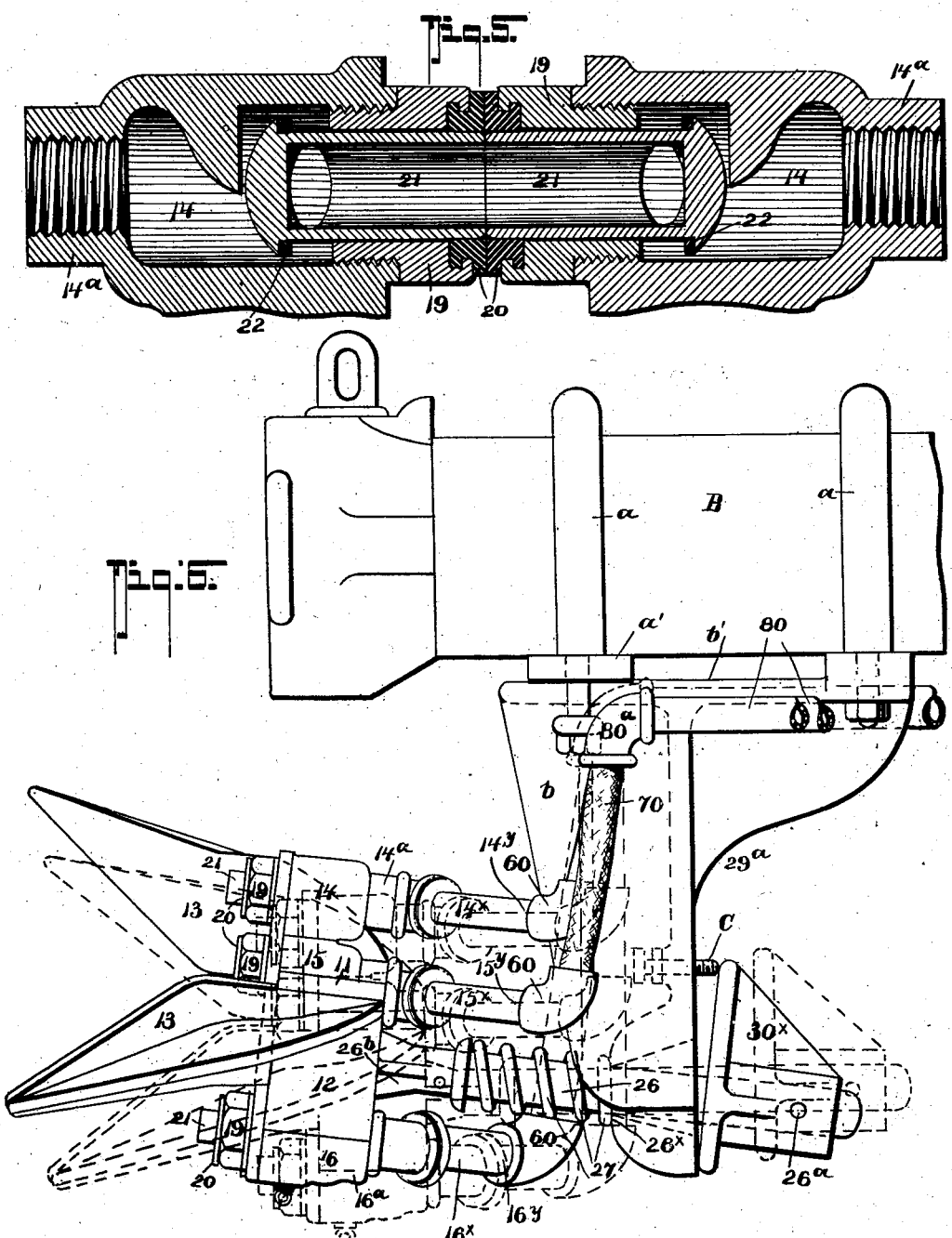

UNITED STATES PATENT OFFICE.

WILLIAM G. TRETHEWEY, OF VANCOUVER, CANADA, ASSIGNOR OF ONE-HALF TO THOMAS A. TRENHOLME, OF MONTREAL, CANADA.

AUTOMATIC TRAIN-PIPE COUPLING.

SPECIFICATION forming part of Letters Patent No. 707,988, dated August 26, 1902.

Application filed January 8, 1902. Serial No. 88,915. (No model.)

*To all whom it may concern:*

Be it known that I, WILLIAM GRIFFITH TRETHEWEY, of Vancouver, in the Province of British Columbia and Dominion of Canada, have invented certain new and useful Improvements in Automatic Train-Pipe Couplings, of which the following is a specification.

My present invention, which relates generally to improvements in that type of coupling mechanisms for joining train-pipes adapted to automatically adjust itself, couple up, and uncouple as the draw-bars interlock or separate, more specifically relates to improvements on my special form of automatic train-pipe coupling mechanism disclosed in my Patent No. 672,183, dated April 16, 1901, and said improvements primarily have for their purpose to render the construction of the several parts more simple, economical, and stable and the coöperation thereof positive and convenient.

In its more specific nature my present invention seeks to provide a special arrangement of the pipes in the head, whereby the hose-bags can be attached at such point where the stem or shank of the heads have little or no vertical movement and whereby a short hose-section will suffice for connecting with the train-line and thereby reduce danger of the hose "buckling" and keep it from wearing out too fast.

Another feature of my present invention lies in an improved hanger means for supporting the train-pipe coupling-head capable of being attached to any desired point of the draw-bar.

In its more complete nature my present invention also includes a simple but effective means for tilting the coupling-head upward when attached to an excessively low draw-bar and an improved correlative arrangement of the train-pipe air and steam ducts in the head, whereby to so support the steam-pipe relatively to the other pipes as to prevent the heat therefrom from destroying the soft-rubber gaskets on train-line.

In its more subordinate features my present invention embodies certain novel features of construction and peculiar combinations of parts, including a means for attaching hand-hose bags to the heads, all of which will hereinafter be fully described and specifically pointed out in the appended claims, reference being had to the accompanying drawings, in which—

Figure 1 is a side elevation of my improved train-pipe coupling mechanism, one of the heads being shown in vertical section to better illustrate the correlative arrangement of the parts. Fig. 2 is a plan view of one of the heads and illustrating the improved manner in which the rigid pipe-line sections are connected therewith. Fig. 3 is a rear elevation of one of the train-pipe coupling-heads. Fig. 4 is a front view of improved construction of one of the heads and illustrates the improved means for supporting the head from the draw-bar, the latter being shown in cross-section. Fig. 5 is an enlarged longitudinal section of the upper part of a set of coupling-heads and illustrating a set of valve devices for automatically closing off the signal-pipe when the heads are separated. Fig. 6 is a side view of one of the train-pipe coupling-heads, showing same in its tilted position in full lines ready to engage an opposing tilted head, it being in its straight-way position in dotted lines, the improved hanger devices and the improved manner of connecting the train-pipes with the head being also shown. Figs. 7 and 8 are detail views of the member for tiltably supporting the coupling-head, stem, or shank. Fig. 9 is a longitudinal section illustrating the manner in which my improved coupling is attached to cars not equipped with my device. Fig. 10 is a rear elevation of the hand coupling mechanism. Fig. 10ª is a detail section of the means for fastening the hand coupling-plate P to the pipe coupling-head 10. Fig. 11 is a face view, and Fig. 12 is a cross-section, of a modified form of hand coupling attachment hereinafter referred to.

In my present construction the coupling-head 10 has a front face 10ª of a substantially rectangular form, its diametrically opposite horizontally-disposed corners having webs 11, that taper rearward and terminate at a centrally-disposed boss 12, which extends downward and terminates over the central bore or steam-duct 16, which in the present arrangement of my invention is disposed in a supplemental part of the head that extends pendently from the lower angle or corner, (indicated by $x$,) the reason for which will presently appear.

The horns 13 in the present construction are arranged substantially the same as in my patent before referred to, and they coöperate to effect the same proper alining of the two heads, as set out in said other patent, and the front face of the said heads has the corners 11 also formed with inwardly-projecting lugs $11^a$.

As will be readily seen by reference to Figs. 1, 2, and 3, the rear part of the coupling-heads in my present construction is in a substantially vertical plane, and the several ducts (designated by 14 15 16) at the rear or entrant ends terminate in internally-threaded nipples $14^a$ $15^a$ $16^a$ to receive the threaded ends of the rigid or iron train-pipe sections $14^x$ $15^x$ $16^x$, which project rearwardly from the head in the direction clearly illustrated in Fig. 2 and with their ends $14^y$ $15^y$ $16^y$ disposed at or near the pivotal point of the stem or shank member 26 of the head for the reason presently explained. The ducts 14 16 15 are in the same vertical alinement and are, respectively, for joining with the signal, air, and steam pipes. In the present arrangement of my invention I use an automatically-operating cut-off-valve mechanism for the upper or signal duct and the steam-duct 16, the air-duct 15 being free of such valve devices, as the flow therethrough is controlled by an ordinary cock located at any suitable point in the train-pipe, as is now usually the case. The automatic cut-off valve in my present form may be in the nature of a shiftable valve 21, fitted in a thimble 19, and the thimbles 19, provided with rubber gaskets 20 20, arranged the same as in my patent before referred to, adapted to be shifted to provide an opening between the heads when coupled and to close off the ducts in which they are located automatically when the heads separate. When the type of valve as illustrated in Fig. 5 is used, the said valve can be held closed by the air-pressure back of the rubber flange or head 22. In my present construction the stem 26 has its front end entered into a rectangular slot $26^x$ in the head and held between rearwardly-projecting flanges $26^b$, between which the shank 26 is rigidly held by stud pins or bolts, as shown. The lower or steam duct has a plugged drain-outlet of any approved design. The hangers $29^a$, which in my present construction form a feature of my improvements, comprise a pair of clip members $a$ $a$, adapted to straddle the draw-bar B, (see Figs. 1 and 3,) a distance-piece or clip-bar $a'$ for engaging the under side of the draw-bar, and a pendent bracket, which includes diverging side portions $b$, joined by an integral cross-piece $b'$, adapted to firmly abut the under side of the clip-bar $a'$ and merging at the bottom with the spherical enlargement, having a flat bearing-face $29^x$, provided with a vertical elongated aperture 30, through which the stem or shank 26 passes and in which said stem is fulcrumed to tilt in a vertical or any plane, and to facilitate such movement of the stem 26 the opening 30 is flared at its four edges, as clearly shown in Figs. 6 and 7.

$30^x$ designates a bracket or stop member held on the rear end of the stem 26 by the clamp-bolt $26^x$, and said bracket has the form and the same function as the like part shown in my other patent.

The spring 27 in the present case serves to force the head 10 forward and to bring the member $30^x$ into contact with bearing-face of the bracket $29^x$. In the present construction I have added an adjustable stop in the nature of a screw-bolt C, adapted to engage a threaded aperture $c^x$ in the bracket-wall $29^c$, and said stop-bolt has a nut-head for turning it. By providing an adjustable stop C, arranged as shown, a simple means is provided for causing the stem 26, with the head attached, to tilt upward to the degree desired, the angle being dependent on the distance the stop C is projected to the rear of the bracket 29. Thus should the stud C project, as shown in Fig. 6, and the heads become separated the spring 27 will force the stem and head forward, and in closing up against the bearing-face $29^x$ the stop or bracket $30^x$ will engage the stop C with its upper end as its lower end closes against the face $29^x$, and by reason of such contacting the stem and head will be tilted to bring the head to the angle shown in Fig. 6, which angle can be changed by a proper adjustment of the stop C.

By referring now more particularly to Figs. 1 and 2 it will be noticed the rigid train-pipe sections $14^x$, $15^x$, and $16^x$ extend to a point adjacent the fulcrum or bearing point of the shank or stem 26, and the ends thereof have union-couplings 60 to couple up with the lower ends $70^a$ of the vertically-disposed hose-bags 70, the upper ends of which couple with the unions $80^a$ on the train-pipes 80, as shown. This method of attaching the hose-bags and connecting the train-pipes with the coupling-heads 10 from practical experience I have found a very advantageous one for the reason that by having the bags attached at or adjacent the pivot-point of the stem of the head, where little or no vertical movement takes place, it is possible to use very short sections of hose, as the movement of the spring 27 and spring of draw-bar is all the lower end of the hose-sections move on in a horizontal plane.

Under some conditions, especially where my style of train-pipe coupling-head has to oppose a different type of train-pipe coupling means, it is necessary to provide for joining the ordinary train-pipe coupling ends with my form of head, and to provide for effecting such an adjustment I provide the means shown in detail in Figs. 9, 10, and $10^a$, by reference to which it will be seen said means is in the nature of a hand coupling mechanism, which includes a plate P, adapted to lie flatwise against the head 10 and having short pipe-sections $p\ p'\ p^2$ in practice held in a tight connection with the ducts 14, 15, and 16, and said sections $p\ p'\ p^2$ each has a coupling end $p^x$ of any well-known or approved type, adapted to receive and couple up with the couple end of a hose-bag. The plate P is arranged to detachably connect with the head 10, and for such purpose the said head has screw-tapped apertures $10^c\ 10^c$ to receive the screw-shanks $q$ of the clamps Q, as clearly shown in the drawings. The plates P have the same external contour as the ends of the heads 10, with which they coact.

From the foregoing description, taken in connection with the accompanying drawings, it is thought the complete operation and the advantages of my present invention over my prior construction will be readily understood by those skilled in the art to which it appertains. By dropping the steam-pipe down below the air and signal pipes instead of between them, as before, provides for an air-space between the steam-pipe and the train-line gaskets, and thereby avoids destroying or rotting said gaskets by heat.

In Figs. 11 and 12 I have illustrated a modified form of means for connecting the ordinary type of hand-couplers with my improved train-pipe coupling mechanism, and the said means comprises a head-plate $P^5$, having passages $p^5$, $p^6$, and $p^7$, adapted to aline with the train air and steam ducts of the automatic head or coupling mechanism. At one edge the plate $P^5$ has an inturned hook $p^8$, adapted to project over one edge (see $10^e$, Fig. 12) of the main head 10. At a diametrically opposite point the plate $P^5$ extends over the opposite edge $10^f$ of the head member 10, and said plate $P^5$ at such point has a slotway or pocket $p^9$, in which a wedge clamp plate or bolt $p^{10}$ is held to slide, with its inner end beveled, as at $p^{11}$, and its outer end turned up to form a suitable handhold $p^{12}$, and to hold the clamp $p^{10}$ to any of its adjusted positions a set-screw $p^{13}$, coöperating with a slot $p^{14}$ in the plate $P^5$, is provided, as clearly shown in Fig. 12. An important advantage of this latter form of hand coupling attaching means is the economy in construction and the ease in which the same can be connected to the head 10. Furthermore, said connection can be relied upon for making a tight joint, as the wedge-clamp can be forced in to take up any slight movement that might exist between the plates 10 and $P^5$ for any cause. For example, when new gaskets are placed in the coupling-head they will naturally be a little more prominent than the old ones. By means of the wedge-clamp a positive and uniform pressure can be exerted on all of the gaskets surrounding the several ducts or ways for the air and steam.

Having thus described my invention, what I claim, and desire to secure by United States Letters Patent, is—

1. In a train-pipe coupling mechanism; in combination with a suitable hanger, a coupling means supported in said hanger, comprising a solid shank fulcrumed in the hanger for vertical and lateral motion, a coupling-head attached to and supported upon the outer end of the shank to move freely in a lateral and vertical plane, said shank having means adapted to coöperate with the hanger for sustaining the shank and the head in a horizontal position, said coupling-head including fixedly-held pipe-sections, and flexible connections for joining said sections with the ordinary train-pipe, all being arranged substantially as shown and described.

2. The combination with train-pipes, the hanger 29, the coupling-head, said head having ducts for coöperating with the train-pipes, and a solid stem slidable in the hanger, means for sustaining the stem and head in a predetermined horizontal plane, and the spring for normally forcing the head and its stem forward; of the rigid pipe-sections, joined with the coupling-head ducts, with their free ends extended in a transverse plane with the hanger 29, and a flexible pipe connection for joining the rigid pipes with the train-pipes, all being arranged substantially as shown and for the purposes described.

3. In a train-pipe coupling mechanism as described, a longitudinally-slidable coupling-head, and means for normally pressing it to its forward position; of mechanism for tilting the said head vertically, when said head is forced the limit of its outward thrust, for the purposes set forth.

4. The combination with the hanger 29, the coupling-head longitudinally slidable in said hanger, and supported therein to swing in a vertical plane; of a stop-piece on the rear end of said coupling-head, adapted to engage the hanger, and a stop adjustably held on the hanger for engaging with the upper end of the stop, for the purposes specified.

5. The combination with the vertically-slotted hanger, the coupling-head, including the stem 26 slidably mounted in the slot of the hanger and fulcrumed therein for vertical and lateral movement, the bracket or stop member fixedly secured on the rear end of the stem, the spring 27, and the stop-stud C, adjustably mounted on the hanger to engage with the stop member when the stem and head move forward, for the purposes described.

6. In a train-pipe coupling mechanism of the character described, the combination with the hanger 29 for supporting the pipe coupling mechanism, said hanger including diverging side members, and a cross-head, and the draw-bar; of clip members adapted to straddle the bar, said members including distance-pieces or clip-bars, for coöperating with the threaded ends of the clips, and nutted eyebolts for engaging the clip ends, and made fast to the side members of the hanger-frame, all being arranged substantially as shown and described.

7. In combination with a coupler-head, having a rectangular face with guide-horns placed on a diagonal plane at opposite flat sides of head, and bearing-points arranged on its opposite corners, and apertured nuts having gaskets arranged in ducts on a perpendicular line across the face of said head, a detachable plate, having ducts therethrough designed to register with the ducts in said head, said plate being of the same contour as face of said head, a catch on one side of said plate designed to overlap and grip the relative side of the head, and a slidable bolt, having a beveled inner side arranged on the opposite side of said plate in such a manner as to grip the opposite side of the head, whereby the forcing inward of said bolt, the plate and head will be clamped together.

8. In combination with a coupling-head, having its guide-horns on a diagonal plane from a vertical line and flattened edges at right angles thereto, an attaching-plate of the same form as the face of said head, having a lugged projection on one side, and a lug with a slidable locking-bolt on the other to engage the opposite flattened edges of face of said head.

W. G. TRETHEWEY.

Witnesses:
P. LANCTODY,
WM. B. S. REDDY.